(12) United States Patent
Nagata et al.

(10) Patent No.: US 9,586,582 B2
(45) Date of Patent: Mar. 7, 2017

(54) DRIVING SUPPORT SYSTEM

(71) Applicants: Shinichi Nagata, Yokohama (JP); Yuichi Kumai, Susono (JP); Tsukasa Shimizu, Nagakute (JP); Yoshihiro Ohama, Nisshin (JP)

(72) Inventors: Shinichi Nagata, Yokohama (JP); Yuichi Kumai, Susono (JP); Tsukasa Shimizu, Nagakute (JP); Yoshihiro Ohama, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/406,831

(22) PCT Filed: Jun. 10, 2013

(86) PCT No.: PCT/IB2013/001216
§ 371 (c)(1),
(2) Date: Dec. 10, 2014

(87) PCT Pub. No.: WO2013/186620
PCT Pub. Date: Dec. 19, 2013

(65) Prior Publication Data
US 2015/0142285 A1 May 21, 2015

(30) Foreign Application Priority Data

Jun. 15, 2012 (JP) .................................. 2012-135812

(51) Int. Cl.
*B60W 30/14* (2006.01)
*B60W 30/18* (2012.01)
*G08G 1/16* (2006.01)

(52) U.S. Cl.
CPC .... *B60W 30/143* (2013.01); *B60W 30/18154* (2013.01); *G08G 1/164* (2013.01);
(Continued)

(58) Field of Classification Search
None
See application file for complete search history.

(56) References Cited

U.S. PATENT DOCUMENTS 7,124,027 B1 * 10/2006 Ernst, Jr. ............... B60W 30/09
340/435
2003/0016143 A1 * 1/2003 Ghazarian .............. G08G 1/017
340/901
(Continued)

FOREIGN PATENT DOCUMENTS

CN 101978404 A 2/2011
JP 2006-260217 * 3/2005 ............ B60W 30/08
(Continued)

*Primary Examiner* — Truc M Do
*Assistant Examiner* — Jess Whittington
(74) *Attorney, Agent, or Firm* — Andrews Kurth Kenyon LLP

(57) ABSTRACT

In a driving support system, a target speed profile computing unit determines a target speed on the basis of a safe-condition confirmation end point that is set to a predetermined position in a travel direction of a host vehicle. The safe-condition confirmation end point is a point at which the host vehicle passes through a section following the safe-condition confirmation end point in advance of a moving object that appears from blind areas. In this way, by determining the target speed based on the safe-condition confirmation end point, the drive support control unit is able to support driving in consideration of driving action at the time when the driver actually causes the host vehicle to pass through near the blind areas. Thus, it is possible to appropriately support driving along a feeling of the driver such that inconvenience and a feeling of strangeness are reduced.

5 Claims, 11 Drawing Sheets

(52) U.S. Cl.
CPC ............. *G08G 1/166* (2013.01); *G08G 1/167* (2013.01); *B60W 2720/10* (2013.01); *B60W 2720/103* (2013.01); *B60W 2720/106* (2013.01)

(56) References Cited

U.S. PATENT DOCUMENTS

| | | | |
|---|---|---|---|
| 2004/0193374 A1* | 9/2004 | Hac | B60K 31/0008 701/301 |
| 2007/0043491 A1* | 2/2007 | Goerick | B60K 28/165 701/41 |
| 2009/0204289 A1* | 8/2009 | Lehre | B60W 30/16 701/36 |
| 2011/0025529 A1 | 2/2011 | Uechi et al. | |
| 2011/0307139 A1* | 12/2011 | Caminiti | G08G 1/163 701/32.2 |
| 2012/0083947 A1* | 4/2012 | Anderson | B60W 30/09 701/3 |
| 2012/0130629 A1* | 5/2012 | Kim | B60W 30/085 701/301 |
| 2014/0180568 A1 | 6/2014 | Nagata | |

FOREIGN PATENT DOCUMENTS

| | | |
|---|---|---|
| JP | 2006-260217 A | 9/2006 |
| JP | 2009-245120 A | 10/2009 |
| JP | 2011-194979 A | 10/2011 |
| WO | 2013/021491 A1 | 2/2013 |

\* cited by examiner

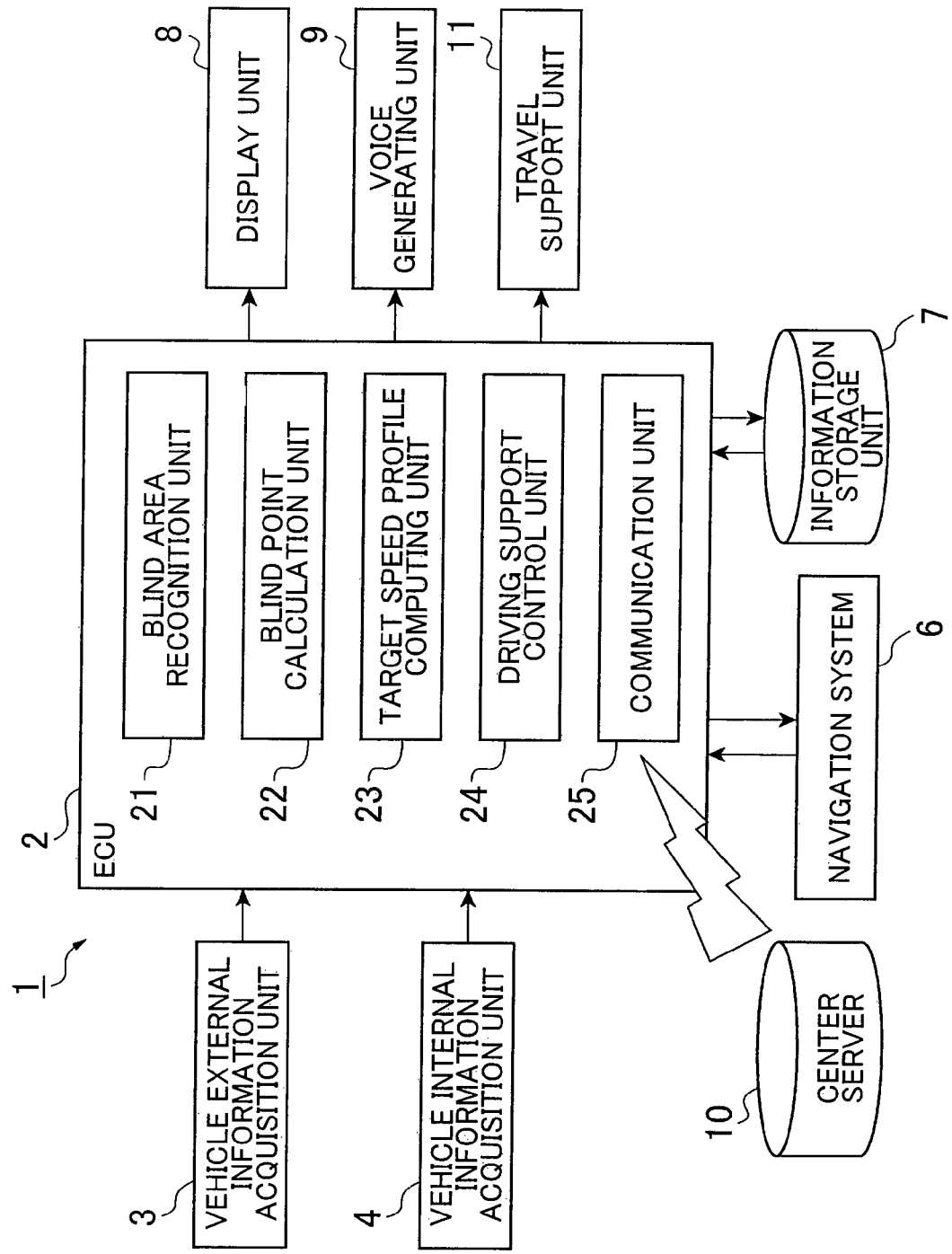

FIG. 7

```
                    START DRIVING
                    SUPPORT PROCESS  — S100
                           │
                    ◇ WHICH SECTION? ◇
        ┌──────────────────┼──────────────────────────┐
  SECTION I          SECTION II                  SECTION III
  (DECELERATION      (SAFE-CONDITION             (SAFE-CONDITION
   SECTION)           CONFIRMATION SECTION)       CONFIRMATION END SECTION)
        │                   │                          │
    S110 ◇ V > Vt? ◇    S130 ◇ V > Vt? ◇          S200 ◇ V > Vt? ◇
     YES │ NO            YES │ NO                  YES │ NO
         │                   │                         │
   S120  │             S140 ESTABLISH             S210 GUIDE DRIVER TO
   GUIDE DRIVER TO          ACCELERATOR                CAUSE HOST VEHICLE
   DEPRESS BRAKE            NON-PERMISSIBLE STATE      TO TRAVEL FORWARD
   (INDICATION,        S150 EXECUTE DECELERATION
   SOUND, ETC.)             CONTROL
                       S160 EXECUTE CONTROL
                            SUCH THAT HOST VEHICLE
                            TRAVELS AT CONSTANT
                            SPEED Va
                       S170 GUIDE DRIVER TO
                            CONFIRM RIGHT AND
                            LEFT SAFE CONDITIONS
                                   │
                              S180 GUIDE DRIVER TO
                                   CONFIRM RIGHT AND
                                   LEFT SAFE CONDITIONS
         │                   │                         │
         └───────────────────┼─────────────────────────┘
                             │
                       END DRIVING
                       SUPPORT PROCESS
```

○ : ACTUAL SAFE-CONDITION CONFIRMATION END POINT
● : TARGET SAFE-CONDITION CONFIRMATION END POINT

US 9,586,582 B2

DRIVING SUPPORT SYSTEM

CROSS-REFERENCE TO RELATED APPLICATIONS

This is a national phase application based on the PCT International Patent Application No. PCT/IB2013/001216 filed Jun. 10, 2013, claiming priority to Japanese Patent Application No. 2012-135812 filed Jun. 15, 2012, the entire contents of both of which are incorporated herein by reference.

BACKGROUND OF THE INVENTION

1. Field of the Invention

The invention relates to a driving support system.

2. Description of Related Art

There is known an existing driving support system that supports driving in consideration of an object that appears from a blind area at the time of entering an intersection, or the like. For example, a driving support system described in Japanese Patent Application Publication No. 2006-260217 (JP 2006-260217 A) predicts a travel direction of a host vehicle, recognizes a blind area for a driver in the travel direction of the host vehicle, predicts an object that appears from the blind area, detects a movable range of the object, determines that there is a likelihood of collision when the movable range overlaps with the predicted travel direction of the host vehicle, and supports driving so as to avoid the collision.

However, the existing driving support system supports driving by utilizing the predicted travel direction of the host vehicle. Thus, the existing driving support system is configured to avoid a collision by determining whether there occurs a collision in the case where the host vehicle travels in accordance with a currently predicted travel direction, and is not able to compute how much the speed is decreased to avoid a collision, how much avoidance operation is conducted to avoid a collision, or the like. In addition, determination as to a collision, which is made by the existing driving support system, significantly depends on the accuracy of prediction of a future position of the host vehicle. Thus, when the accuracy of prediction is low (for example, when the host vehicle is accelerating, decelerating or being steered), the accuracy of determination as to a collision may decrease. In this case, the existing driving support system supports driving unnecessarily or does not support driving at necessary timing, with the result that a driver may experience a feeling of strangeness.

SUMMARY OF THE INVENTION

The invention provides a driving support system that is able to appropriately support driving along a feeling of a driver.

A driving support system includes: a blind area recognition unit that recognizes a blind area for a driver in a travel direction of a host vehicle; a target speed determining unit that determines a target speed of the host vehicle on the basis of the blind area recognized by the blind area recognition unit; and a driving support unit that supports driving of the host vehicle on the basis of the target speed determined by the target speed determining unit, wherein the target speed determining unit determines the target speed on the basis of a safe-condition confirmation end point that is set to a first predetermined position in the travel direction of the host vehicle, and the safe-condition confirmation end point is a point at which the host vehicle passes through a section following the safe-condition confirmation end point in the travel direction of the host vehicle in advance of a moving object that appears from the blind area.

When the driver actually drives the host vehicle, the driver may cause the host vehicle to travel to near the blind area, confirm safe conditions, end confirming safe conditions and then pass through near the blind area. Thus, depending on the details of driving support (for example, driving support for excessively, decelerating the host vehicle, or the like) at the time when the host vehicle has travelled to near the blind area, driving support may be not along a feeling of the driver and, as a result, the driver may be made to experience inconvenience or a feeling of strangeness. On the other hand, in the above-described driving support system, the target speed determining unit determines the target speed on the basis of the safe-condition confirmation end point that is set to the first predetermined position in the travel direction of the host vehicle. The safe-condition confirmation end point is a point at which the host vehicle passes through the section following the safe-condition confirmation end point in advance of the moving object that appears from the blind area. In this way, by determining the target speed based on the safe-condition confirmation end point, the driving support unit is able to support driving in consideration of driving action at the time when the driver actually causes the host vehicle to pass through near the blind area. Thus, it is possible to appropriately support driving along a feeling of the driver such that inconvenience and a feeling of strangeness are reduced.

In the driving support system, the target speed determining unit may compute the safe-condition confirmation end point on the basis of a relative position between the blind area and the host vehicle, a speed of the host vehicle and an assumed speed of the moving object that appears from the blind area. Through computation in this way, it is possible to utilize the appropriate safe-condition confirmation end point based on the condition in which the host vehicle travels toward the blind area.

In the driving support system, the target speed determining unit may determine the target speed further on the basis of a safe-condition confirmation start point that is set to a second predetermined position before the safe-condition confirmation end point in the travel direction of the host vehicle, and the safe-condition confirmation start point may be a point at which it is ensured a set line-of-sight angle with respect to the blind area. When the driver actually drives the host vehicle, the driver may confirm safe conditions near the blind area before the driver ends confirming safe conditions and causes the host vehicle to pass through near the blind area. Thus, when the target speed determining unit determines the target speed on the basis of the safe-condition confirmation start point at which it is ensured the set line-of-sight angle, the driving support unit is able to support driving in consideration of driving action at the time when the driver actually causes the host vehicle to pass through near the blind area. Thus, it is possible to appropriately support driving along a feeling of the driver such that inconvenience and a feeling of strangeness are reduced.

In the driving support system, the target speed determining unit may determine the target speed further on the basis of a deceleration start point that is set to a third predetermined position before the safe-condition confirmation start point in the travel direction of the host vehicle, and the deceleration start point may be a point at which, by starting deceleration from the deceleration start point, the host vehicle is able to decelerate to a preset reference speed by the time when the host vehicle reaches the safe-condition confirmation start point. When the driver actually drives the host vehicle, the driver may confirm safe conditions in a state where the speed of the host vehicle has been decelerated. Thus, when the target speed determining unit determines the target speed on the basis of the deceleration start point at which the host vehicle is able to decelerate to the reference speed (which is a speed at which the driver confirms safe conditions) by the time when the host vehicle reaches the safe-condition confirmation start point, the driving support unit is able to support driving in consideration of driving action at the time when the driver actually causes the host vehicle to pass through near the blind area. Thus, it is possible to appropriately support driving along a feeling of the driver such that inconvenience and a feeling of strangeness are reduced.

In the driving support system, the driving support unit may support driving on the basis of the safe-condition confirmation end point and an actual safe-condition confirmation end point at which the driver of the host vehicle has started accelerating operation. Thus, even when the actual safe-condition confirmation end point at which the driver has actually ended confirming safe conditions differs from the desired safe-condition confirmation end point, it is possible to appropriately support driving such that the actual safe-condition confirmation end point is brought close to the desired safe-condition confirmation end point.

The driving support system may further include an information acquisition unit that acquires information about a state of the driver of the host vehicle, wherein the driving support unit may determine the state of the driver on the basis of the information acquired by the information acquisition unit and support driving on the basis of the determined state of the driver.

According to the invention, it is possible to appropriately support driving along a feeling of a driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a block configuration view of a driving support system according to an embodiment;

FIG. 7 is a flowchart that shows the details of a drive support process shown in FIG. 6;

DETAILED DESCRIPTION OF EMBODIMENTS

Hereinafter, an embodiment of a driving support system will be described with reference to the accompanying drawings.

Figure 2A:
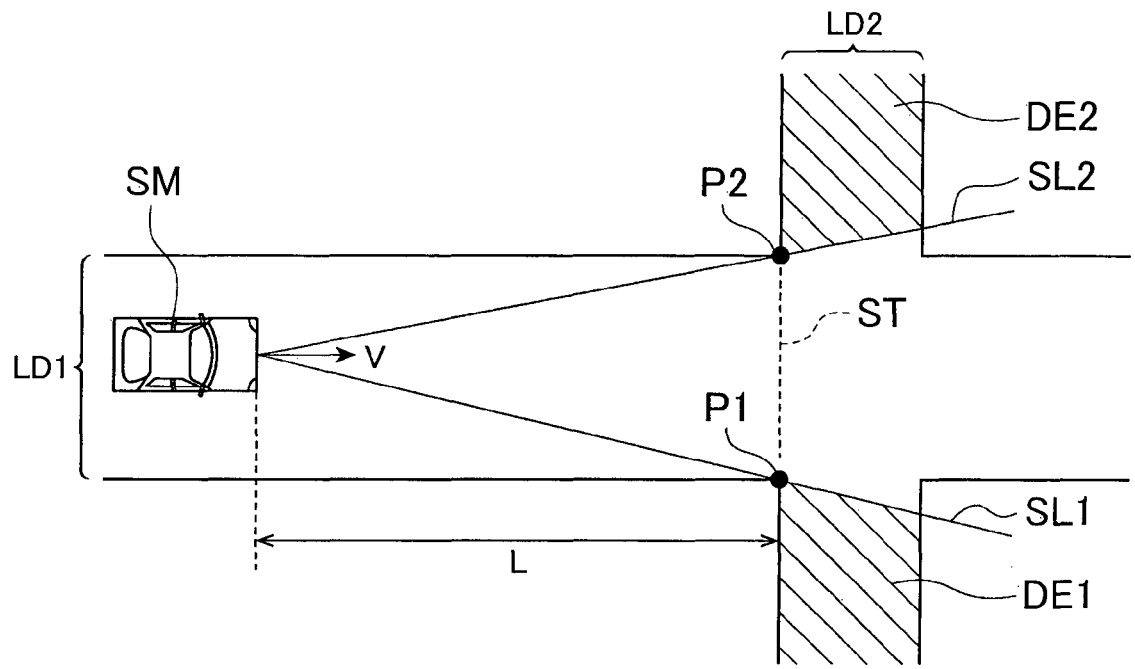
FIG. 2A is a view that shows an example of a state immediately before a host vehicle SM enters an intersection.
Figure 2B:
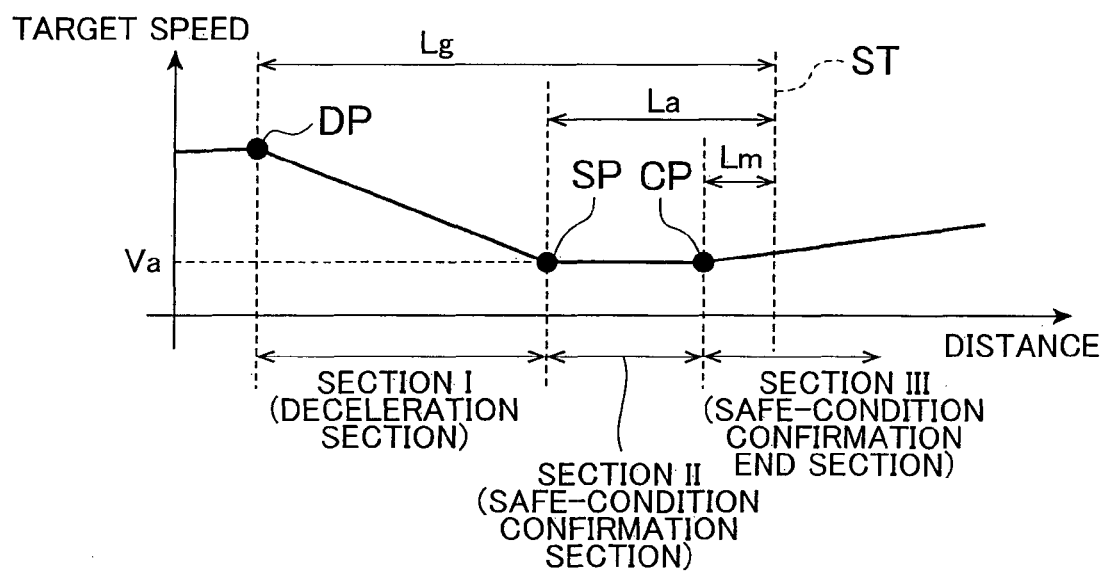
FIG. 2B is a view that shows a target speed profile drawn on the basis of a target speed immediately before the host vehicle SM enters the intersection.

FIG. 1 is a block configuration view of the driving support system according to the embodiment. FIG. 2A is a view that shows an example of a state immediately before a host vehicle SM enters an intersection. FIG. 2B is a view that shows a target speed profile that is drawn on the basis of a target speed immediately before the host vehicle SM enters the intersection. At the intersection shown in FIG. 2A, the host vehicle SM travels on a road LD1, and a road LD2 intersects with the road LD1. In FIG. 2A, it is assumed that the road LD1 on which the host vehicle SM travels is a through street. It is assumed that a structure, such as a wall, a fence and a building, is provided at least on each side of the road LD1. At such an intersection, as shown in FIG. 2A, a blind area DE1 is formed on the right side of the host vehicle SM, and a blind area DE2 is formed on the left side of the host vehicle SM. The view of a driver in the host vehicle SM is obstructed at a right-side blind point P1 and a left-side blind point P2. Thus, the right-side blind area DE1 is formed on the right-side area with respect to a sight line SL1 that passes through the right-side blind point P1. The left-side blind area DE2 is formed on the left-side area with respect to a sight line SL2 that passes through the left-side blind point P2. In the present embodiment, corners of the intersection respectively correspond to the blind point P1 and the blind point P2. In the present embodiment, for the sake of easy computation, the starting point of each of the sight lines SL1, SL2 is set to the center portion of the front end of the host vehicle SM; instead, it may be set to a position of driver's eyes. The driving support system 1 supports driving of the host vehicle SM such that the host vehicle SM is able to reliably avoid a collision even if a moving object appears from any one of the blind areas DE1, DE2. In the present embodiment, description will be made on the case where other vehicles RM, LM are respectively assumed as moving objects that appears from the blind areas DE1, DE2 (see FIG. 3A and FIG. 4A).

As shown, in FIG. 1, the driving support system 1 includes an electronic control unit (ECU) 2, a vehicle external information acquisition unit 3, a vehicle internal information acquisition unit 4, a navigation system 6, an information storage unit 7, a display unit (driving support unit) 8, a voice generating unit (driving support unit) 9 and a travel support unit (driving support unit) 11. The driving support system 1 is communicable with a center server 10.

The vehicle external information acquisition unit 3 has the function of acquiring information about an outside around the host vehicle SM. Specifically, the vehicle external information acquisition unit 3 has the function of acquiring various pieces of information, such as a structure that forms a blind area around the host vehicle SM, a moving object such as a vehicle, a pedestrian and a bicycle, and a white line and a stop line near an intersection. The vehicle external information acquisition unit 3 is, for example, formed of a camera that acquires an image around the host vehicle SM, a millimeter-wave radar, a laser radar, and the like. The vehicle external information acquisition unit 3 is able to detect a structure on each side of a road or an object, such as a vehicle, by, for example, detecting an edge present around the vehicle with the use of the radars. In addition, the vehicle external information acquisition unit 3 is able to detect a white line, a pedestrian or a bicycle around the host vehicle SM through, for example, an image captured by the camera. The vehicle external information acquisition unit 3 outputs acquired vehicle external information to the ECU 2.

The vehicle internal information acquisition unit 4 has the function of acquiring information about the inside of the host vehicle SM. The vehicle internal information acquisition unit 4 acquires information about a state of the driver of the host vehicle SM. Specifically, the vehicle internal information acquisition unit 4 is able to detect the position of the driver inside the host vehicle SM, the orientation of the head of the driver, the direction of the sight line of the driver, and the like. The vehicle internal information acquisition unit 4 is, for example, provided around a driver seat, and is formed of a camera, or the like, that captures the image of the driver. The vehicle internal information acquisition unit 4 outputs acquired vehicle internal information to the ECU 2.

The navigation system 6 has various pieces of information, such as map information, road information and traffic information, in order to guide the driver. The navigation system 6 outputs predetermined information to the ECU 2 at required timing. The information storage unit 7 has the function of storing various pieces of information, and is, for example, able to store past driving information of the driver and various databases. The information storage unit 7 outputs predetermined information to the ECU 2 at required timing.

The display unit 8, the voice generating unit 9 and the travel support unit 11 have the function of supporting driving operation of the driver DP in accordance with a control signal from the ECU 2. The display unit 8 is, for example, formed of a monitor, a head-up display, or the like, and has the function of displaying information for driving support. The voice generating unit 9 is formed of a speaker, a buzzer, or the like, and has the function of emitting voice or a buzzer sound for driving support. The travel support unit 11 is formed of a braking device, a drive device and a steering device, and has the function of decelerating to a target speed and the function of moving to a target lateral position.

The ECU 2 is an electronic control unit that comprehensively controls the driving support system 1. The ECU 2 is, for example, mainly formed of a CPU, and includes a ROM, a RAM, an input signal circuit, an output signal circuit, a power supply circuit, and the like. The ECU 2 includes a blind area recognition unit 21, a blind point calculation unit 22, a target speed profile computing unit (target, speed determining unit) 23, a driving support control unit (driving support unit) 24 and a communication unit 25.

The blind area recognition unit 21 has the function of recognizing the blind areas DE1, DE2 for the driver of the host vehicle SM in the travel direction of the host vehicle SM. The blind area recognition unit 21 is able to acquire the position of the host vehicle SM, the position of the driver, the position of the intersection of the road LD1 and the road LD2 (the positions of the structures that form the blind areas), and the like, from various pieces of information acquired by the vehicle external information acquisition unit 3 and the vehicle internal information acquisition unit 4, and to recognize the blind areas DE1, DE2 from the relationship among those positions. In addition, the blind point calculation unit 22 has the function of calculating the blind points P1, P2 on the basis of the blind areas DE1, DE2 recognized by the blind area recognition unit 21. In addition, the blind point calculation unit 22 has the function of calculating the relative position of the blind points P1, P2 with respect to the host vehicle SM. In the example shown in FIG. 2A, the relative position of the blind points P1, P2 with respect to the host vehicle SM, that is, a relative distance L between the blind points P1, P2 and the host vehicle SM, is set as a distance between a reference position ST, indicated by a straight line that connects the blind point P1 to the blind point P2, and the front end of the host vehicle SM. However, the reference position ST may be set in any way in accordance with the shapes of the roads at the intersection, the arrangement and shape of the structure that forms each blind area, and the like, and the relative position of the blind points P1, P2 with respect to the host vehicle SM may be set in any way.

The target speed profile computing unit 23 has the function of determining the target speed of the host vehicle SM on the basis of the blind areas DE1, DE2 recognized by the blind area recognition unit 21. In addition, the target speed profile computing unit 23 has the function of computing the target speed profile of the host vehicle SM by setting the target speed at each position in the travel direction of the host vehicle SM. FIG. 2B shows a target speed profile at the time when the host vehicle SM enters the intersection. The left-side region with respect to the reference position ST shows the target speed, profile of the host vehicle SM before the blind points P1, P2, and the right-side region with respect to the reference position ST shows the target speed profile of the host vehicle SM after passage of the blind points P1, P2 (after entering the intersection). In addition, the target speed profile computing unit 23 has the function of determining the target speed on the basis of a safe-condition confirmation end point CP, a safe-condition confirmation start point SP and a deceleration start point DP. The target speed profile has a deceleration section I (a section between the deceleration start point DP and the safe-condition confirmation start point SP), a safe-condition confirmation section II (a section between the safe-condition confirmation start point SP and the safe-condition confirmation end point CP) and a safe-condition confirmation end section III (a section following the safe-condition confirmation end point CP). The details of the safe-condition confirmation end point CP, safe-condition confirmation start point. SP and deceleration start point DP will be described later.

The driving support control unit 24 has the function of controlling driving support by transmitting control signals to the display unit 8, the voice generating unit 9 and the travel support unit 11 on the basis of the determined target speed, that is, on the basis of the target speed profile computed by the target speed profile computing unit 23. The driving support control unit 24 executes driving support with the use of indication, sound, vibration, brake, brake assist, and the like, when the actual speed of the host vehicle SM is higher than the target speed. In the present embodiment, the target speed profile has the deceleration section I, the safe-condition confirmation section II and the safe-condition confirmation end section III, so the driving support control unit 24 supports driving in correspondence with each section. The details of driving support will be described later.

The communication unit 25 has the function of communicating with the center server 10. The communication unit 25 has the function of transmitting information held in the host vehicle SM to the center server 10, and has the function of receiving information from the center server 10. In the present embodiment, the communication unit 25 is able to transmit, to the center server 10, information about how the host vehicle SM has behaved near each blind area that has been passed while travelling. In addition, the communication unit 25 is able to acquire, from the center server 10, information about how a plurality of vehicles (including other vehicles and the host vehicle SM) have behaved.

Here, the safe-condition confirmation end point CP, the safe-condition confirmation start point SP and the deceleration start point DP and a method of calculating those points will be described.

The safe-condition confirmation end point CP is a point at which the host vehicle SM passes through the section following the safe-condition confirmation end point CP (safe-condition confirmation end section III) in advance of a moving object that appears from the blind areas DE1, DE2. The safe-condition confirmation end point CP is a point at which, because the host vehicle SM has sufficiently come close to the blind areas DE1, DE2 as a driver's feeling, it is assumed that the host vehicle SM passes through first even when there is a moving object that suddenly runs out in the case where the driver ends confirming safe conditions and starts accelerating the host vehicle SM. The safe-condition confirmation end section III is a section in which it is assumed that the host vehicle SM passes through without a collision with a moving object that may suddenly run out from the blind areas DE1, DE2 even when the driver ends confirming safe conditions and starts accelerating the host vehicle SM. The safe-condition confirmation end point CP is set to a predetermined position (first predetermined position) before the blind points P1, P2 in the travel direction of the host vehicle SM. In the present embodiment, as shown in FIG. 2B, the safe-condition confirmation end point CP is set to a position that is a safe-condition confirmation end distance Lm before the reference position ST. When the host vehicle SM travels at a predetermined speed V or higher in the safe-condition confirmation end section III that is the section following the safe-condition confirmation end point CP, even when it is assumed that a moving object (the vehicle RM in the example shown in FIG. 3A) appears from the right-side blind area DE1 at the instance when the host vehicle SM has reached the safe-condition confirmation end point CP, the host vehicle SM passes through the intersection without a collision with the moving object, and, even when it is assumed that a moving object (the vehicle LM in the example shown in FIG. 3A) appears from the left-side blind area DE2 at the instance when the host vehicle SM has reached the safe-condition confirmation end point CP, the host vehicle SM passes through the intersection without a collision with the moving object. Thus, even when the host vehicle SM accelerates (that is, travels at a speed higher than the predetermined speed V) at the safe-condition confirmation end point CP (or within the following safe-condition confirmation end section III), the host vehicle SM passes through without a collision with the moving object that is assumed to run out from the blind areas DE1, DE2.

The target speed profile computing unit 23 may calculate the safe-condition confirmation end point CP through computation using a mathematical expression or may calculate the safe-condition confirmation end point CP on the basis of data prepared in advance. The target speed profile computing unit 23 is able to calculate the safe-condition confirmation end point CP on the basis of the relative position between the blind areas DE1, DE2 and the host vehicle SM, the speed V of the host vehicle SM and an assumed speed of the moving object (here, the vehicle RM or the vehicle LM) that appears from the blind areas DE1, DE2.

An example of a calculating method will be specifically described with reference to FIG. 3A to FIG. 4B. The target speed profile computing unit 23 computes a condition L1 in which the host vehicle SM passes through in advance of the vehicle RM that appears from the right-side blind area DE1 and a condition L2 in which the host vehicle SM passes through in advance of the vehicle LM that appears from the left-side blind area DE2, computes the safe-condition confirmation end distance Lm on the basis of the condition L1 and the condition L2, and then calculates the safe-condition confirmation end point CP. In the following description, the host vehicle SM travels straight ahead at a constant speed V, the vehicle RM travels straight ahead at an assumed constant speed VR, and the vehicle LM travels straight ahead at an assumed constant speed VR, and the speed and lateral position of each vehicle do not change on the way. In addition, in the following description, "front", "rear", "right" and "left" are set with reference to the travel direction of each vehicle.

Condition L1

Figure 3A:
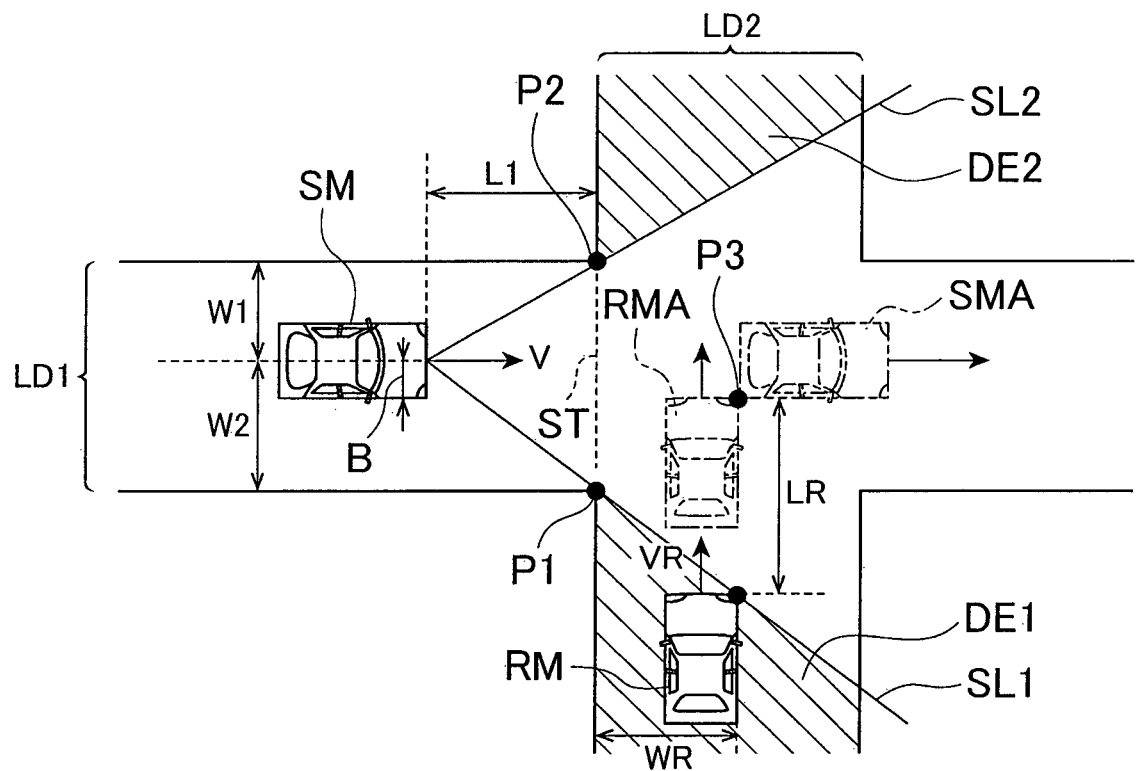
FIG. 3A is a model view for computing a safe-condition confirmation end point.
Figure 3B:
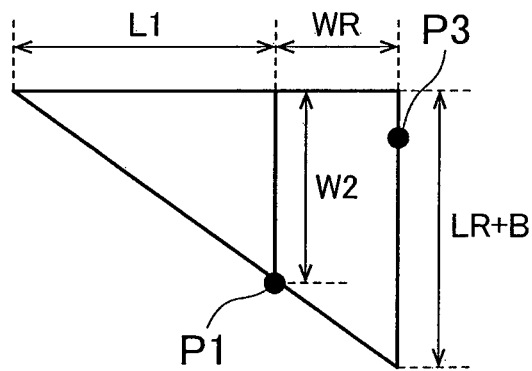
FIG. 3B is a view that shows the dimensional relationship among the host vehicle SM, a blind point P1 and a corner portion P3.

FIG. 3A and FIG. 3B are model views for computing the condition L1. The condition L1 indicates the relative distance between the host vehicle SM and the blind areas DE1, DE2, and, here, it is assumed that, at the time point when the distance between the front end of the host vehicle SM and the reference position ST becomes L1, the vehicle RM appears from the blind area DE1 (at this time point, the front-right corner portion of the vehicle RM contacts the sight line SL1). It is assumed that the distance between the right peripheral portion of the vehicle RM and the host vehicle SM-side peripheral portion of the road LD2 is WR. The size of the host vehicle SM in the vehicle width direction is 2B, and, as for the lateral position of the host vehicle SM, the distance between the central axis of the host vehicle SM and the left peripheral portion of the road LD1 is W1, and the distance between the central axis of the host vehicle SM and the right peripheral portion of the road LD1 is W2. As indicated by the dotted line in FIG. 3A, the condition L1 is calculated in consideration of a state where the front-right corner portion of the vehicle RM and the rear-right corner portion of the host vehicle SM coincide with each other at a corner portion P3 (the strictest condition within the condition in which the host vehicle SM passes through in advance of the vehicle RM). In this state, the position of the host vehicle SM is denoted by SMA, and the position of the vehicle RM is denoted by RMA. From FIG. 3A, the distance that the host vehicle SM moves to the position SMA is (L1+WR). On the other hand, the distance that the vehicle RM moves to the position RMA is denoted by LR.

Here, the distance LR is an unknown quantity; however, a right-angled triangle that is drawn from the positional relationship between the host vehicle SM and the blind point P1 and a right-angled triangle that is drawn from the positional relationship between the host vehicle SM and the corner portion P3 are geometrically similar. Thus, from the dimensional relationship shown in FIG. 3B, the relationship expressed by the mathematical expression (1A) holds. By expanding the mathematical expression (1A) into the mathematical expression (2A), the distance LR is expressed by the mathematical expression (3A). A period of time t1 in which the host vehicle SM reaches the position SMA is expressed by the mathematical expression (4A), a period of time t2 in which the vehicle RM reaches the position RMA is expressed by the mathematical expression (5A) and t1=t2, so, from, the relationship with the mathematical expression (3A), the mathematical expression (6A) holds. By modifying the mathematical expression (6A) into the mathematical expression (7A) and the mathematical expression (8A), L1 that satisfies the mathematical expression (9A) is derived as the condition L 1 in which the host vehicle SM passes through in advance of the vehicle RM that appears from the right-side blind area DE1.

$$(LR+B):(L1+WR)=W2:L1 \tag{1A}$$

$$W2 \cdot (L1+WR)=L1 \cdot (LR+B) \tag{2A}$$

$$LR=(W2 \cdot WR+W2 \cdot L1-B \cdot L1)/L1 \tag{3A}$$

$$t1=(WR+L1)/V \tag{4A}$$

$$t2=LR/VR \tag{5A}$$

$$(WR+L1)/V=(W2 \cdot WR+W2 \cdot L1-B \cdot L1)/(L1 \cdot VR) \tag{6A}$$

$$L1^2+(VR \cdot WR+V \cdot B-V \cdot W2) \cdot L1+(-V \cdot W2 \cdot WR)=0 \tag{7A}$$

$$L1^2+bR \cdot L1+cR=0 \tag{8A}$$

$$L1=\{-bR \pm \operatorname{sqrt}(bR^2-4 \cdot cR)\}/2 \tag{9A}$$

(where L1>0)

Condition L2

Figure 4A:
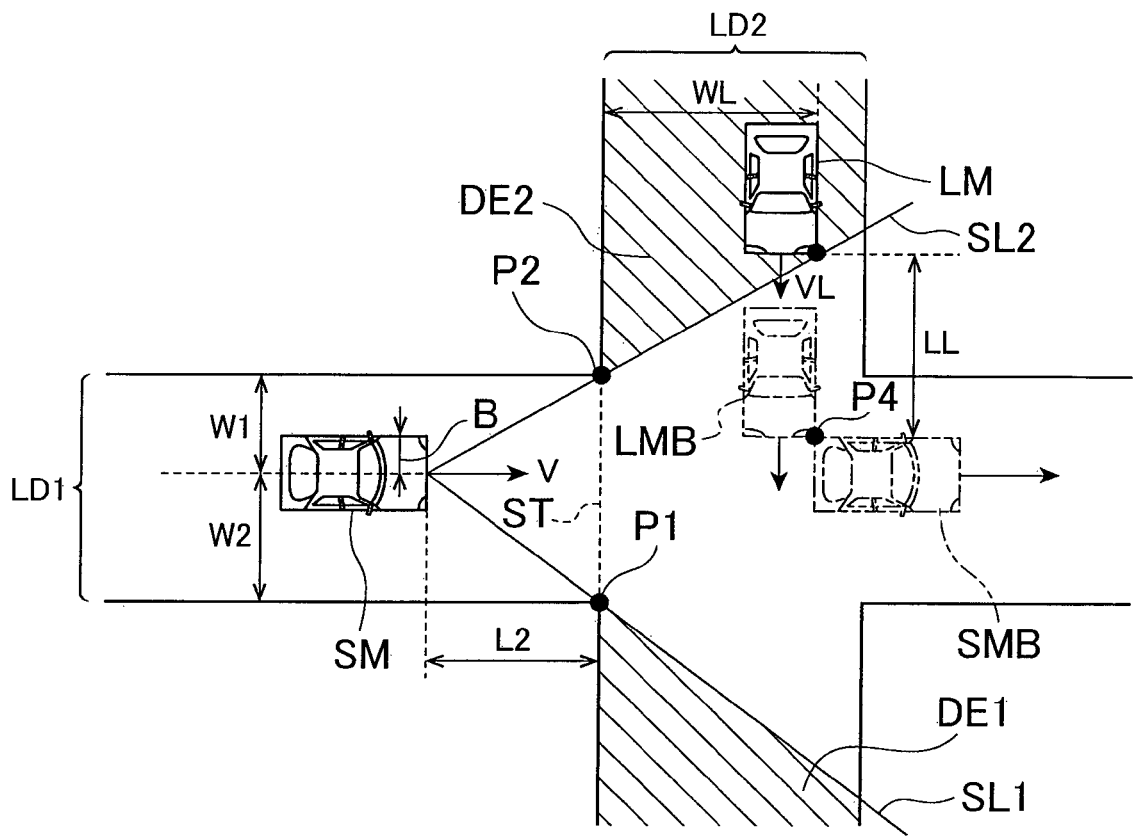
FIG. 4A is a model view for computing a safe-condition confirmation end point.
Figure 4B:
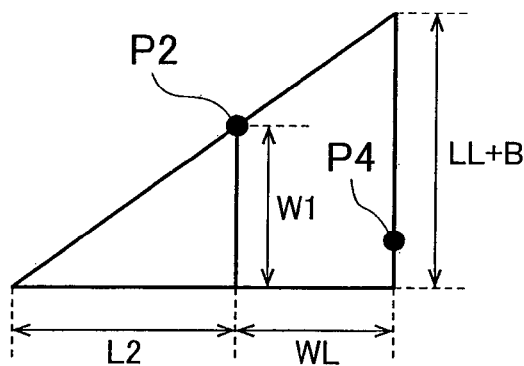
FIG. 4B is a view that shows the dimensional relationship among the host vehicle SM, a blind point P2 and a corner portion P4.

FIG. 4A and FIG. 4B are model views for computing the condition L2. The condition L2 indicates the relative distance between the host vehicle SM and the blind areas DE1, DE2, and, here, it is assumed that, at the time point when the distance between the front end of the host vehicle SM and the reference position ST becomes L2, the vehicle LM appears from the blind area DE2 (at this time point, the front-left corner portion of the vehicle LM contacts the sight line SL2). It is assumed that the distance between the left peripheral portion of the vehicle LM and the host vehicle SM-side peripheral portion of the road LD2 is WL. The size of the host vehicle SM in the vehicle width direction is 2B, and, as for the lateral position of the host vehicle SM, the distance between the central axis of the host vehicle SM and the left peripheral portion of the road LD1 is W1, and the distance between the central axis of the host vehicle SM and the right peripheral portion of the road LD1 is W2. As indicated by the dotted line in FIG. 4A, the condition L2 is calculated in consideration of a state where the front-left corner portion of the vehicle LM and the rear-left corner portion of the host vehicle SM coincide with each other at a corner portion P4 (the strictest condition within the condition in which the host vehicle SM passes through in advance of the vehicle LM). In this state, the position of the host vehicle SM is denoted by SMB, and the position of the vehicle LM is denoted by LMB. From FIG. 4A, the distance that the host vehicle SM moves to the position SMB is (L2+WL). On the other hand, the distance that the vehicle LM moves to the position LMB is denoted by LL.

Here, the distance LL is an unknown quantity; however, a right-angled triangle that is drawn from the positional relationship between the host vehicle SM and the blind point P2 and a right-angled triangle that is drawn from the positional relationship between the host vehicle SM and the corner portion P4 are geometrically similar. Thus, from the dimensional relationship shown in FIG. 4B, the relationship expressed by the mathematical expression (1B) holds. By expanding the mathematical expression (1B) into the mathematical expression (2B), the distance LL is expressed by the mathematical expression (3B). A period of time t1 in which the host vehicle SM reaches the position SMB is expressed by the mathematical expression (4B), a period of time t2 in which the vehicle LM reaches the position LMB is expressed by the mathematical expression (5B) and t1=t2, so, from the relationship with the mathematical expression (3B), the mathematical expression (6B) holds. By modifying the mathematical expression (6B) into the mathematical expression (7B) and the mathematical expression (8B), L2 that satisfies the mathematical expression (9B) is derived as the condition L2 in which the host vehicle SM passes through in advance of the vehicle LM that appears from the left-side blind area DE2.

$$(LL+B):(L2+WL)=W1:L2 \tag{1B}$$

$$W1 \cdot (L2+WL)=L2 \cdot (LL+B) \tag{2B}$$

$$LL=(W1 \cdot WL+W1 \cdot L2-B \cdot L2)/L2 \tag{3B}$$

$$t1=(WL+L2)/V \tag{4B}$$

$$t2=LL/VL \tag{5B}$$

$$(WL+L2)/V=(W1 \cdot WL+W1L2-B \cdot L2)/(L2 \cdot VL) \tag{6B}$$

$$L2^2+(VL \cdot WL+V \cdot B-V \cdot W1) \cdot L2+(-V \cdot W1 \cdot WL)=0 \tag{7B}$$

$$L2^2+bL \cdot L2+cL=0 \tag{8B}$$

$$L2=\{-bL \pm \operatorname{sqrt}(bL^2-4 \cdot cL)\}/2 \tag{9B}$$

(where L2>0)

The target speed profile computing unit 23 derives the safe-condition confirmation end distance Lm by using the following mathematical expression (10) on the basis of L1 and L2 calculated as described above. That is, the target speed profile computing unit 23 sets a smaller one of L1 and L2 for the safe-condition confirmation end distance Lm. Thus, the safe-condition confirmation end point CP shown in FIG. 2B is set. It is assumed that the host vehicle SM immediately starts acceleration at the safe-condition confirmation end point CP, the target speed profile shown in FIG. 2B is a profile such that the target speed increases at a constant acceleration in the safe-condition confirmation end section III. However, the target speed profile in the safe-condition confirmation end section III may be set in any way, may be accelerated in a mode other than a constant acceleration, may be a constant speed, may be decelerated or the target speed profile may end at the safe-condition confirmation end point CP or at a position that is a predetermined distance from the safe-condition confirmation end point CP.

$$Lm=\min(L1,L2) \tag{10}$$

Next, the safe-condition confirmation start point SP will be described. The safe-condition confirmation start point SP is a point at which it is ensured a set line-of-sight angle with respect to the blind areas DE1, DE2. That is, the safe-condition confirmation start point SP is a point at which it is possible to confirm safe conditions in a state where the set line-of-sight angle is ensured with respect to the blind areas DE1, DE2 by starting to confirm safe conditions at the safe-condition confirmation start point SP. The safe-condition confirmation section II is a section in which it is ensured a line-of-sight angle larger than or equal to a set angle and the host vehicle SM travels at a low speed for safe-condition confirmation. The safe-condition confirmation start point SP is set to a predetermined position (second predetermined position) ' before the safe-condition confirmation end point CP. In the present embodiment, as shown in FIG. 2B, the safe-condition confirmation start' point SP is set to a position that is a safe-condition confirmation start distance La before the reference position ST.

The target speed profile computing unit 23 may calculate the safe-condition confirmation start point SP through computation by using a mathematical expression or may calculate the safe-condition confirmation start point SP on the basis of data prepared in advance. The target speed profile computing unit 23 is able to calculate the safe-condition confirmation start point SP on the basis of the relative position between the blind areas DE1, DE2 and the host vehicle SM, the speed V of the host vehicle SM and the line-of-sight angle θ with respect to the blind areas. Through computation in this way, it is possible to utilize the appropriate safe-condition confirmation end point CP based on the condition in which the host vehicle SM travels toward the blind areas DE1, DE2.

Figure 5:
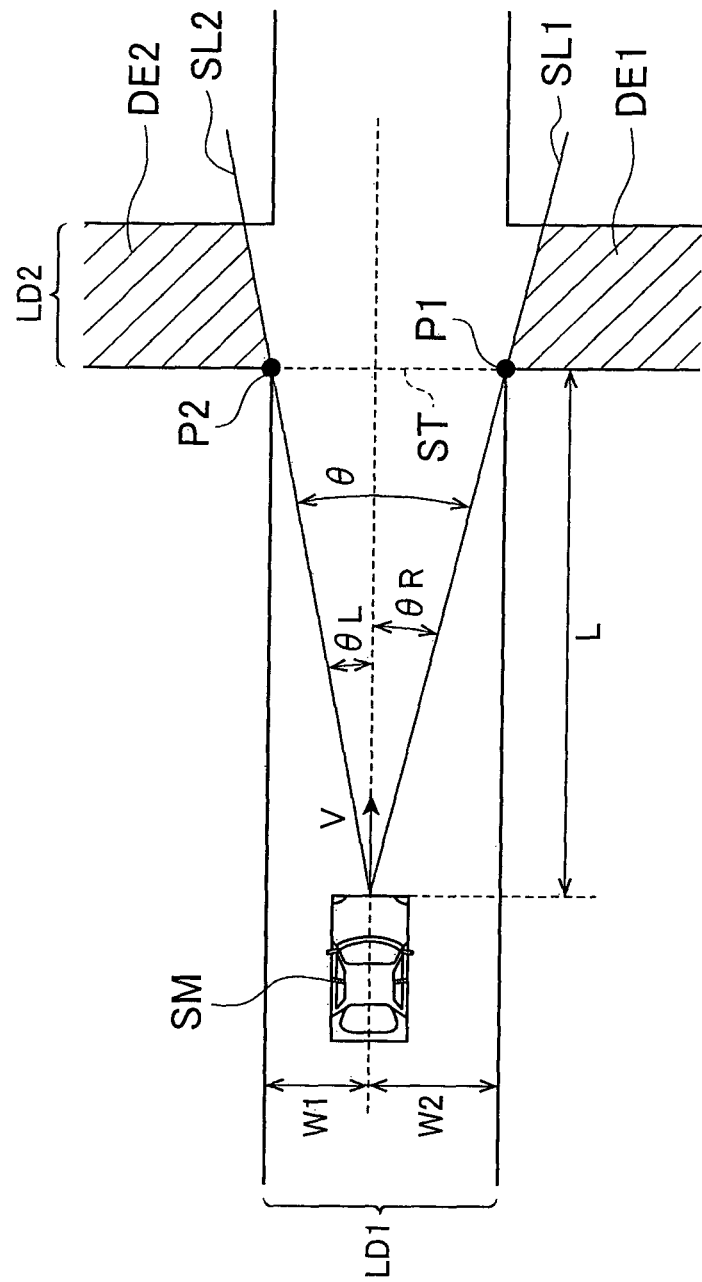
FIG. 5 is a model view for computing a safe-condition confirmation start point.

An example of a calculating method will be specifically described with reference to FIG. 5. The target speed profile computing unit 23 determines the safe-condition confirmation start point SP and the target speed such that it is ensured the line-of-sight angle larger than or equal to a set line-of-sight angle θa for a set period of time Ta before the host vehicle SM passes the blind areas. The set line-of-sight angle θa required for safe-condition confirmation and the set period of time Ta required for safe-condition confirmation are set to selected values in advance in correspondence with states of the intersection and blind areas. As shown in FIG. 5, a line-of-sight angle θR with respect to the right-side blind area DE1 is expressed by the mathematical expression (11), and a line-of-sight angle θL with respect to the left-side blind area DE2 is expressed by the mathematical expression (12). Here, the line-of-sight angle θ with respect to the overall blind areas is expressed by the mathematical expression (13), so the distance La (safe-condition confirmation start distance La) at which the set line-of-sight angle θa is ensured is calculated by using the mathematical expression (14). A target minimum speed Va for ensuring the set period of time Ta for safe-condition confirmation is calculated by the mathematical expression (15). In the target speed profile shown in FIG. 2B, the target speed is constant at the target minimum speed Va in the safe-condition confirmation section II.

$$\theta R = a\tan(W2/L) \tag{11}$$

$$\theta L = a\tan(W1/L) \tag{12}$$

$$\theta = \theta R + \theta L \tag{13}$$

$$\theta a = a\tan(W2/La) + a\tan(W1/La) \tag{14}$$

$$Va = La/Ta \tag{15}$$

Next, the deceleration start point DP will be described. The deceleration start point DP is a point at which the host vehicle SM is able to decelerate to a preset reference speed by the time when the host vehicle SM reaches the safe-condition confirmation start point SP by starting deceleration from the deceleration start point DP. Here, the reference speed is a target speed at the safe-condition confirmation start point SP. The deceleration start point DP is set to a predetermined position (third predetermined position) before the safe-condition confirmation start point SP. In the present embodiment, as shown in FIG. 2B, the deceleration start point DP is set to a position that is a deceleration start distance Lg before the reference position ST.

The target speed profile computing unit 23 may calculate the deceleration start point DP through computation or may calculate the deceleration start point DP on the basis of data prepared in advance. An example of a computing method will be described. The target speed profile computing unit 23 sets a target acceleration a (<0), and sets the deceleration start point DP such that it is possible to decelerate from the current speed V of the host vehicle to the target minimum speed Va by the time when the host vehicle reaches the safe-condition confirmation start point SP. That is, the mathematical expression (16) holds from the relationship between a speed and an acceleration, the mathematical expression (17) is obtained by modifying the mathematical expression (16), and the deceleration start distance Lg is calculated by using the mathematical expression (17).

$$Va^2 - V^2 = 2 \cdot a \cdot (Lg - La) \tag{16}$$

$$Lg = (Va^2 - V^2)/(2 \cdot a) + La \tag{17}$$

A method of calculating the safe-condition confirmation end point CP, the safe-condition confirmation start point SP and the deceleration start point DP is not limited to the above-described computation. For example, the target speed profile computing unit 23 may calculate the safe-condition confirmation end point CP, the safe-condition confirmation start point SP and the deceleration start point DP on the basis of ambient information around the blind areas. Specifically, the safe-condition confirmation end point CP may be set by calculating the safe-condition confirmation end distance Lm through weighted linear sum utilizing ambient information, such as the width of the road LD1 on which the host vehicle SM travels, the presence or absence of a center line and the presence or absence of a sidewalk. When a variable x1 (how many meters the road width is) and a weighted coefficient a1 are set for the factor "road width", a variable x2 (1 is substituted when there is a center line, and 0 is substituted when there is no center line) and a weighted coefficient a2 are set for the factor "presence or absence of a center line" and a variable x3 (1 is substituted when there is a sidewalk, and 0 is substituted when there is no sidewalk) and a weighted coefficient a3 are set for the factor "presence or absence of a sidewalk", the safe-condition confirmation end distance Lm is calculated by using the mathematical expression (18). It may be calculated by another factor, and another factor may be further added. The weighted coefficient of each factor may be learned through multiple regression analysis on the basis of the kinetic action of a model drive, or the like, in advance. The safe-condition confirmation start distance La and the deceleration start distance Lg may also be set in a similar method.

$$Lm = a1 \cdot x1 + a2 \cdot x2 + a3 \cdot x3 \tag{18}$$

In addition, the target speed profile computing unit 23 may calculate the safe-condition confirmation end point CP, the safe-condition confirmation start point SP and the deceleration start point DP on the basis of a database stored for each blind area. For example, the safe-condition confirmation end point CP, the safe-condition confirmation start point SP and the deceleration start point DP are stored in the information storage unit 7, the navigation system 6 or the center server 10 as a database, for each blind area (for example, for each intersection) at the time when a model driver, or the like, drives a vehicle in advance. The target speed profile computing unit 23 loads a safe-condition confirmation end point for a blind area (intersection), toward which the host vehicle SM travels, from the database in any one of the information storage unit 7, the navigation system 6 and the center server 10, and sets the loaded safe-condition confirmation end point as the safe-condition confirmation end point CP. It is possible to set the safe-condition confirmation start point SP and the deceleration start point DP in a similar method.

In addition, behaviors of a plurality of drivers for each blind area may be collected by the center server 10 and information may be shared with other drivers. For example, at the time when a driver causes a vehicle to pass through a blind area, and when the driver actually ends confirming safe conditions, the corresponding safe-condition confirmation end point is measured, and the information is uploaded to the center server 10. When a plurality of drivers upload such information at a plurality of blind areas, it is possible to collect a plurality of pieces of information in the center server 10 for each blind area. By calculating an average value, or the like, for each blind area in the center server 10 on the basis of the collected pieces of information, an appropriate safe-condition confirmation end point is calculated. At the time when the host vehicle SM passes through a blind area, it is possible to acquire a safe-condition confirmation end point calculated for the intended blind area by contacting the center server 10. The safe-condition confirmation start point SP and the deceleration start point DP may also be set in a similar method.

Figure 6:
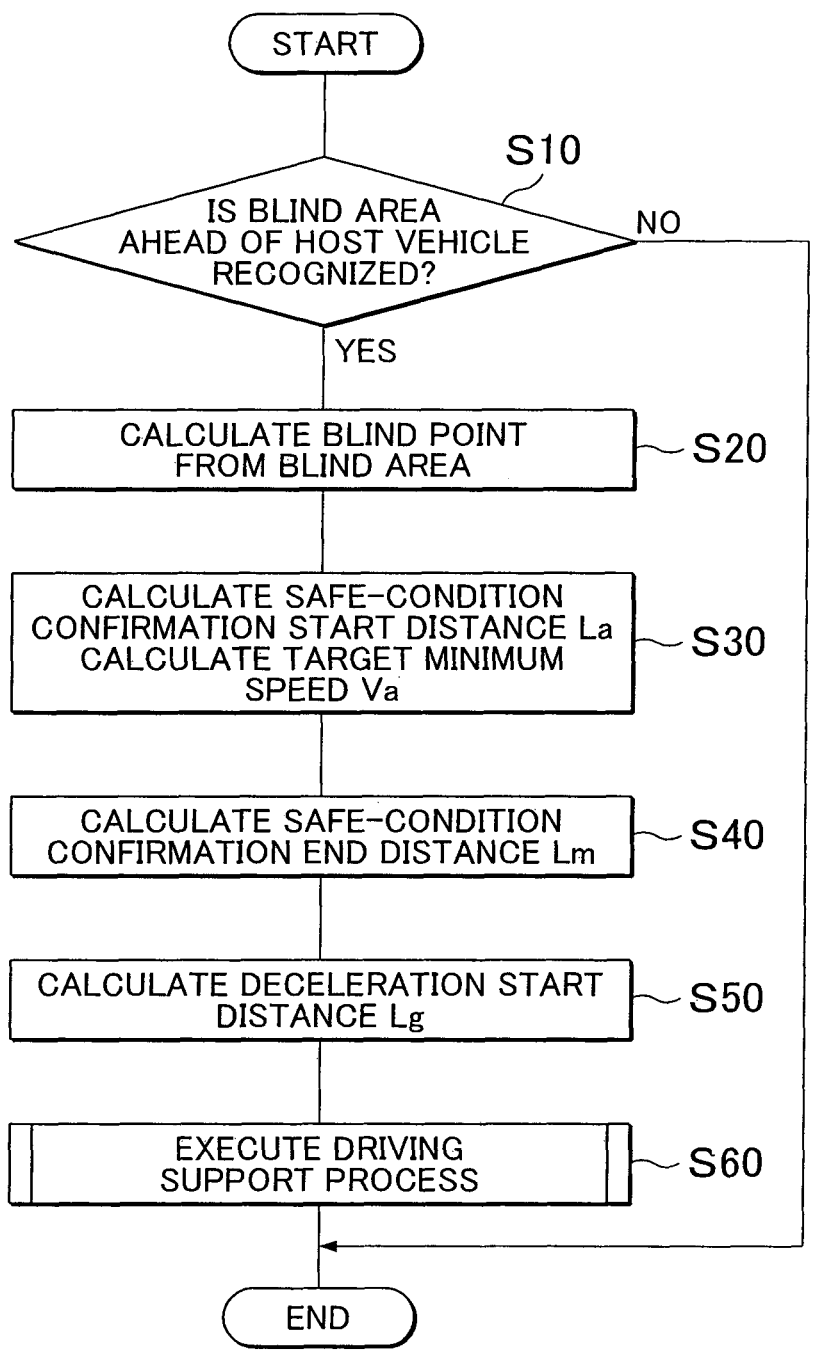
FIG. 6 is a flowchart that shows the process details that are executed in the driving support system.

Next, an example control process of the driving support system 1 will be described with reference to FIG. 6 and FIG. 7. In the present embodiment, process details in a situation that the host vehicle SM enters an intersection as shown in FIG. 2A will be described. FIG. 6 is a flowchart that shows the process details that are executed in the driving support system 1. The process is repeatedly executed at set intervals while the host vehicle SM is in operation. FIG. 7 is a flowchart that shows the details of a driving support process shown in FIG. 6.

As shown in FIG. 6, the blind area recognition unit 21 of the ECU 2 executes a process for recognizing a blind area on the basis of information from the vehicle external information acquisition unit 3 and the vehicle internal information acquisition unit 4, and determines whether a blind area is recognized ahead of the host vehicle SM (step S10). When no blind area is recognized, the process shown in FIG. 6 ends, and the process starts again from S10. On the other hand, when it is determined in S10 that a blind area is recognized, the blind point calculation unit 22 calculates a blind point on the basis of the blind area recognized in S10 (step S20). In the present embodiment, the blind area recognition unit 21 is able to recognize the blind areas DE1, DE2 by acquiring the position of the host vehicle SM in the road LD1 and acquiring the positions of structures that form the blind areas DE1, DE2 in the travel direction. In addition, the blind point calculation unit 22 calculates the blind points P1, P2 from the recognized blind areas DE1, DE2.

Subsequently, as shown in FIG. 2A and FIG. 2B, the target speed profile computing unit 23 computes the target speed profile by calculating the safe-condition confirmation end point CP, the safe-condition confirmation start point SP and the deceleration start point DP by calculating the safe-condition confirmation end distance Lm, the safe-condition confirmation start distance La and the deceleration start distance Lg, and determining the target speed at each position in the travel direction of the host vehicle SM on the basis of the safe-condition confirmation end point CP, the safe-condition confirmation start point SP and the deceleration start point DP (step S30 to step S50).

Specifically, the target speed profile computing unit 23 calculates the safe-condition confirmation start distance La, and calculates the target minimum speed Va (step S30). Thus, it is possible to calculate the safe-condition confirmation start point SP. Subsequently, the target speed profile computing unit 23 calculates the safe-condition confirmation end distance Lm (step S40). Thus, it is possible to calculate the safe-condition confirmation end point CP. In S40, when the safe-condition confirmation end distance Lm is calculated by using the above-described mathematical expressions (1A) to (9A), (1B) to (9B), computation is performed where the speed V of the host vehicle SM is the target minimum speed Va calculated in S30. Subsequently, the target speed profile computing unit 23 calculates the deceleration start distance Lg (step S50). By so doing, it is possible to calculate the deceleration start point DP. In computation of S30 to S50, as described above, the target speed profile computing unit 23 may calculate the safe-condition confirmation end distance Lm, the safe-condition confirmation start distance La and the deceleration start distance Lg from a physical positional relationship, may calculate the safe-condition confirmation end distance Lm, the safe-condition confirmation start distance La and the deceleration start distance Lg by utilizing ambient information about the blind areas, may calculate the safe-condition confirmation end distance Lm, the safe-condition confirmation start distance La and the deceleration start distance Lg by utilizing information in the databases or may calculate the safe-condition confirmation end distance Lm, the safe-condition confirmation start distance La and the deceleration start distance Lg by utilizing information from the center server 10.

As the deceleration start point DP, the safe-condition confirmation start point SP and the safe-condition confirmation end point CP are calculated, the deceleration section I, the safe-condition confirmation section II and the safe-condition confirmation end section III are determined, so it is possible to compute the target speed profile in each of the sections I, II, III. In the example shown in FIG. 2, the target speed profile that the host vehicle SM decelerates at a constant acceleration from the speed at the time of computation to the target minimum speed Va is set in the deceleration section I, the target speed profile that the host vehicle SM travels at the constant target minimum speed Va is set in the safe-condition confirmation section II, and the target speed profile that the host vehicle SM accelerates at a constant acceleration is set in the safe-condition confirmation end section III. Determination of the target speed, that is, setting of the target speed profile, may be made at any timing of S30 to S50, the target speed profile may be set sequentially at timing at which it is possible to set the target speed in each section or the target profiles of all the sections may be computed at a time after all the deceleration start point DP, the safe-condition confirmation start point SP and the safe-condition confirmation end point CP are calculated.

Figure 8:
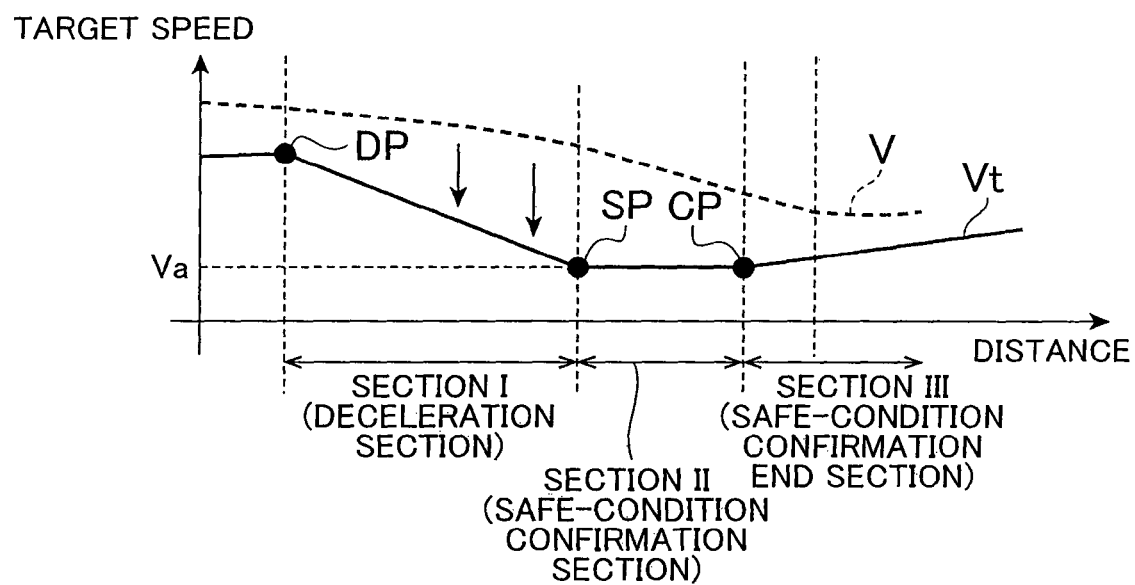
FIG. 8 is a view that shows an actual speed profile and a target speed profile.

After computation of the target speed profiles has been completed through the processes of S30 to S50, the driving support control unit 24 executes the driving support process on the basis of the target speed profile (step S60). After the target speed profiles have been computed, the process of FIG. 7 is repeatedly executed until driving support based on the target speed profiles ends. In the driving support process according to the present embodiment, when the actual speed V of the host vehicle SM is higher than the target speed Vt as shown in FIG. 8, the driving support control unit 24 supports driving in correspondence with each of the sections I, II, III through indication, sound, vibration, control brake, brake assist, or the like. In FIG. 8, a graph drawn by the dotted line shows a speed profile that is drawn on the basis of the actual speed V of the host vehicle SM, and a solid-line graph shows the target speed profile (which is the same as the graph shown in FIG. 2B) that is drawn on the basis of the determined target speed Vt. As shown in FIG. 7, the driving support control unit 24 acquires the current position of the host vehicle SM on the basis of information from the vehicle external information acquisition unit 3, and determines whether the host vehicle SM is present in any section in the target speed profile (step S100).

First, the process in the case where the host vehicle SM is present in the deceleration section I will be described. When the host vehicle SM is present in the deceleration section I, the driving support control unit 24 determines whether the actual speed V of the host vehicle SM is higher than the target speed Vt set for, the current position of the host vehicle SM (step S110). When it is determined in S110 that the actual speed V is higher than the target speed Vt, the driving support control unit 24 transmits a control signal to the display unit 8 or the voice generating unit 9, and guides the driver through calling for attention by indication or sound to decelerate by depressing the brake (step S120). On the other hand, when it is determined in S110 that the actual speed V is lower than or equal to the target speed Vt, the process of FIG. 7 ends without driving support, and repeats the process again from S100. In this way, the deceleration section I is a section in which a certain distance to the blind areas DE1, DE2 is ensured, so high-level driving support (for example, forcible brake, or the like) is not carried out, and just a guidance is provided to the driver. Thus, while the actual speed V of the host vehicle, SM is brought close to the target speed Vt, driving support that is able to reduce inconvenience and a feeling of strangeness, experienced by the driver.

Next, the process that is executed in the case where the host vehicle SM is present in the safe-condition confirmation section II will be described. When the host vehicle SM is present in the safe-condition confirmation section II, the driving support control unit 24 determines whether the actual speed V of the host vehicle SM is higher than the target speed Vt set for the current position of the host vehicle SM (step S130). When it is determined in S130 that the actual speed V is higher than the target speed Vt, the driving support control unit 24 transmits a control signal to the travel support unit 11 and establishes an accelerator non-permissible state where the vehicle does not accelerate even when the driver depresses the accelerator (step S140), and executes deceleration control (step S150). The driving support control unit 24 transmits a control signal to the travel support unit 11, and, when the actual speed V of the host vehicle SM has decelerated to the target minimum speed Va (which corresponds to the target speed Vt in the safe-condition confirmation section II), executes control such that the host vehicle SM travels at a constant speed that coincides with the target minimum speed Va (step S160). In addition, the driving support control unit 24 transmits a control signal to the display unit 8 or the voice generating unit 9, and guides the driver to confirm right and left safe conditions (step S170). On the other hand, when it is determined in S130 that the actual speed V is lower than or equal to the target speed Vt, only a guidance to right and left safe-condition confirmation is carried out (step S180), the process of FIG. 7 ends, and the process is repeated again from S100. In this way, the safe-condition confirmation section II is a section that is required for the vehicle to travel in accordance with the target speed profile in order to reliably confirm safe conditions, so high-level driving support is carried out. Thus, in order to make it possible to reliably ensure safety, it is possible to support driving such that the actual speed V of the host vehicle SM is brought close to the target speed Vt.

Next, the process that is executed in the case where the host vehicle SM is present in the safe-condition confirmation end section III will be described. When the host vehicle SM is present in the safe-condition confirmation end section III, the driving support control unit 24 determines whether the actual speed V of the host vehicle SM is higher than the target speed Vt set for the current position of the host vehicle SM (step S200). When it is determined in S200 that the actual speed V is lower than or equal to the target speed Vt, the driving support control unit 24 transmits a control signal to the display unit 8 or the voice generating unit 9, and guides the driver through indication or sound to cause the host vehicle SM to travel forward (step S210). Thus, even when a moving object appears from the blind areas DE1, DE2, the host vehicle SM passes through first. On the other hand, when it is determined in S110 that the actual speed V is higher than the target speed Vt, the process of FIG. 7 ends without driving support, and the process is repeated again from S100. In this way, in the safe-condition confirmation end section III, driving is supported such that the host vehicle SM is caused to quickly pass through the blind areas DE1, DE2 without a collision with a moving object that suddenly runs out.

When the host vehicle SM passes through the intersection and travels to a position for which no target speed profile is set, the driving support process shown in FIG. 7 ends. In addition, the process shown in FIG. 6 also ends.

Next, the operation and advantageous effects of the driving support system 1 according to the present embodiment will be described.

For example, when the host vehicle passes through near a blind area, it is possible to support driving such that a moving object that suddenly appears from the blind area is assumed, a speed range in which the host vehicle may collide with the moving object is calculated and the speed of the host vehicle is not brought to fall within the speed range. In addition, it is also possible to compute a target speed profile that the calculated speed range is avoided. However, there may be a deviation between the thus computed target speed profile and an actual speed profile of the host vehicle at the time when the driver causes the host vehicle to pass through near a blind area. For example, when the driver actually drives the host vehicle, the driver may cause the host vehicle to travel to near the blind area, confirm safe conditions, end confirming safe conditions, accelerate the host vehicle and then pass through near the blind area. On the other hand, in the computed target speed profile, when the target speed for a position near the blind area is excessively lower than that in actual driving, driving may be supported not along a feeling of the driver and causes the driver to experience inconvenience or a feeling of strangeness depending on the details of driving support (for example, driving is supported such that the host vehicle; is excessively decelerated).

In contrast to this, with the driving support system 1 according to the present embodiment, the target speed profile computing unit 23 determines the target speed on the basis of the safe-condition confirmation end point CP that is set to a predetermined position in the travel direction of the host vehicle SM. The safe-condition confirmation end point CP is a point at which the host vehicle SM passes through the section following the safe-condition confirmation end point CP in advance of the moving object that appears from the blind areas DE1, DE2. In this way, by determining the target speed based on the safe-condition confirmation end point CP, the driving support control unit 24 is able to support driving in consideration of driving action at the time when the driver actually causes the host vehicle SM to pass through near the blind areas DE1, DE2. Thus, it is possible to appropriately support driving along a feeling of the driver such that inconvenience and a feeling of strangeness are reduced.

In the driving support system 1, the target speed profile computing unit 23 determines the target speed further on the basis of the safe-condition, confirmation start point SP that is set to a predetermined position before the safe-condition confirmation end point CP in the travel direction of the host vehicle SM, and the safe-condition confirmation start point SP is a point at which it is ensured the set line-of-sight angle θ with respect to the blind areas DE1, DE2. When the driver actually drives the host vehicle SM, the driver may confirm safe conditions near the blind areas DE1, DE2 before the driver ends confirming safe conditions and causes the host vehicle SM to pass through near the blind areas DE1, DE2. Thus, when the target speed profile computing unit 23 determines the target speed on the basis of the safe-condition confirmation start point SP at which it is ensured the set line-of-sight angle θ, the driving support control unit 24 is able to support driving in consideration of driving action at the time when the driver actually causes the host vehicle SM to pass through near the blind areas DE1, DE2. Thus, it is possible to appropriately support driving along a feeling of the driver such that inconvenience and a feeling of strangeness are reduced.

In the driving support system 1, the target speed profile computing unit 23 determines the target speed further on the basis of the deceleration start point DP that is set to a predetermined position before the safe-condition confirmation start point SP in the travel direction of the host vehicle SM, and the deceleration start point DP is a point at which, by starting deceleration from the deceleration start point DP, the host vehicle SM is able to decelerate to the preset reference speed by the time when the host vehicle SM reaches the safe-condition confirmation start point SP. When the driver actually drives the host vehicle SM, the driver may confirm safe conditions in a state where the speed of the host vehicle SM has been decelerated. Thus, when the target speed profile computing unit 23 determines the target speed on the basis of the deceleration start point DP at which the host vehicle SM is able to decelerate to the reference speed (which is a speed at which the driver confirms safe conditions, and is the target minimum speed Va in the present embodiment) by the time when the host vehicle SM reaches the safe-condition confirmation start point SP, the driving support control unit 24 is able to support driving in consideration of driving action at the time when the driver actually causes the host vehicle SM to pass through near the blind areas DE1, DE2. Thus, it is possible to appropriately support driving along a feeling of the driver such that inconvenience and a feeling of strangeness are reduced.

The invention is not limited to the above-described embodiments.

For example, the driving support control unit 24 may support driving on the basis of the computed safe-condition confirmation end point CP and an actual safe-condition confirmation end point at which the driver of the host vehicle SM has started accelerating operation (that is, operation to change the accelerator from an off state to an on state). The driving support control unit 24 has the function of calculating an actual safe-condition confirmation end point, at which the driver has, actually end confirming safe conditions, on the basis of accelerating operation before and after passing through near the blind points P1, P2. In addition, the driving support control unit 24 compares the computed safe-condition confirmation end point (here, referred to as "target safe-condition confirmation end point") with the actual safe-condition confirmation end point, and appropriately supports driving in accordance with the situation. Thus, even when the actual safe-condition confirmation end point at which the driver actually starts to end confirming safe conditions differs from the target safe-condition confirmation end point, it is possible to appropriately support driving such that the actual safe-condition confirmation end point is brought close to the target safe-condition confirmation end point. The driving support control unit 24, for example, supports driving based on the position of the actual safe-condition confirmation end point and the actual speed of the host vehicle SM in accordance with each of situations shown in FIG. 9.

Figure 9:
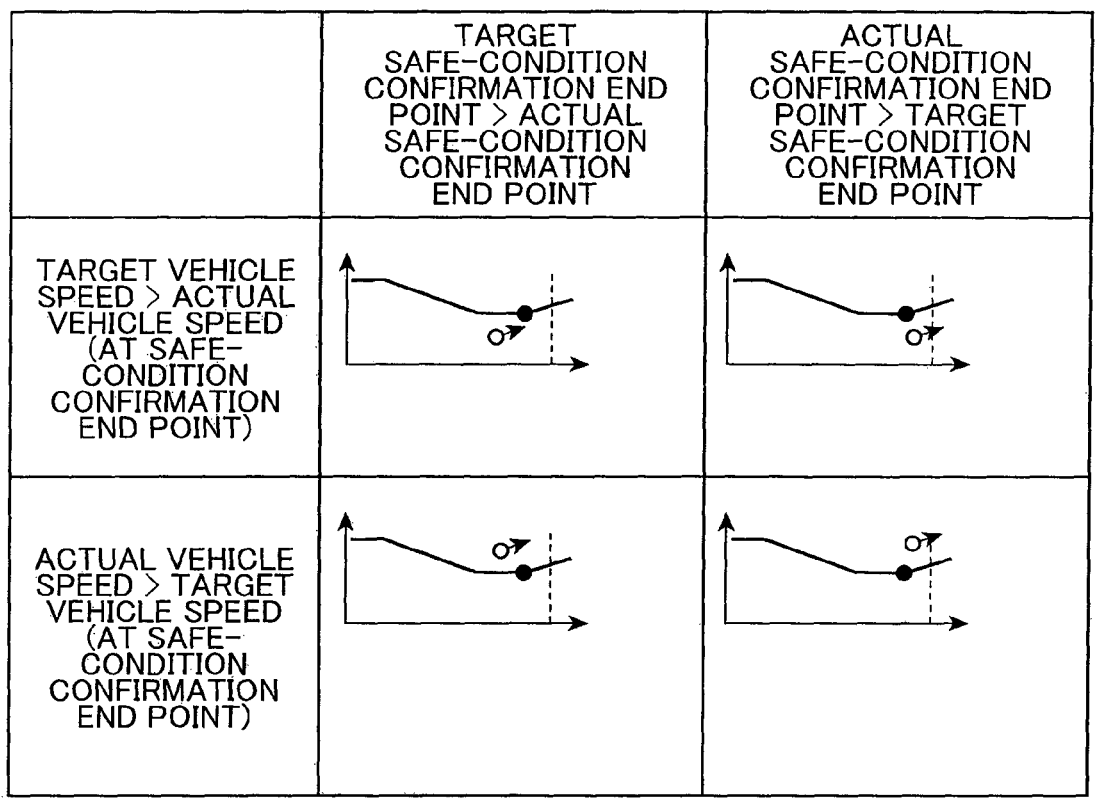
FIG. 9 is a table that shows the relationship between a target safe-condition confirmation end point and an actual safe-condition confirmation end point.

As shown in the upper-left field in FIG. 9, when the actual safe-condition confirmation end point is located before the target safe-condition confirmation end point and the actual speed at the actual safe-condition confirmation end point is lower than the target speed, a speed change (the inclination angle of an arrow affixed to an outlined circle indicating the actual safe-condition confirmation end point) is estimated, and driving is supported on the basis of the speed change. That is, when it is determined that the speed change is large and the actual speed profile passes above the target safe-condition confirmation end point, driver's accelerating operation is not permitted, and a message "confirm right and left safe conditions" lights up for calling for attention. On the other hand, when it is estimated that the actual speed profile passes below the target safe-condition confirmation end point, driver's accelerating operation is permitted. As shown in the lower-left field of FIG. 9, the actual safe-condition confirmation end point is located before the target safe-condition confirmation end point and the actual speed at the actual safe-condition confirmation end point is higher than the target speed, driver's accelerating operation is not permitted, and a message "confirm right and left safe conditions" lights up for calling for attention. As shown in the upper-right field of FIG. 9, when the actual safe-condition confirmation end point is located at a position that is advanced with respect to the target safe-condition confirmation end point and the actual speed at the actual safe-condition confirmation end point is lower than the target speed, driver's accelerating operation is permitted. As shown in the lower-right field of FIG. 9, when the actual safe-condition confirmation end point is located at a position that is advanced with respect to the target safe-condition confirmation end point and the actual speed at the actual safe-condition confirmation end point is higher than the target speed, driver's accelerating operation is not permitted, and a message "watch for speed" lights up for calling for attention.

In addition, the driving support control unit 24 may determine a driver's state on the basis of information acquired by the vehicle internal information acquisition unit 4, and may support driving on the basis of the determined result. That is, in the above-described embodiments, drive is supported such that the actual speed is brought into agreement with the computed target speed profile. However, there is a case where it is more important that the driver confirms safe conditions, checks for another vehicle at an intersection, and then causes the host vehicle SM to pass through the intersection than that the speed of the host vehicle SM is controlled. Thus, by supporting driving on the basis of information from the vehicle internal information acquisition unit 4, it is possible to appropriately support driving based on the actual state of the driver.

For example, a face recognition camera for recognizing the face direction of the driver is installed inside the host vehicle SM, and the driving support control unit 24 determines the number of driver's actions for confirming right and left safe conditions before passing through the blind points P1, P2, and determines whether to support driving on the basis of the determined result. Specifically, before passing through the blind points P1, P2, a safe-condition confirmation start point at which it is ensured a certain set line-of-sight angle θx (this computation may be carried out in a computing method similar to that for the safe-condition confirmation start point SP according to the above-described embodiments). Subsequently, a safe-condition confirmation end point is calculated as in the case of the above-described embodiments. After that, while the host vehicle SM is passing between the safe-condition confirmation start point and the safe-condition confirmation end point, the number of times the driver confirms right and left safe conditions is counted. When the number of times for confirmation is smaller than a preset threshold, a message "confirm right and left safe conditions" lights up or blinks.

Figure 10:
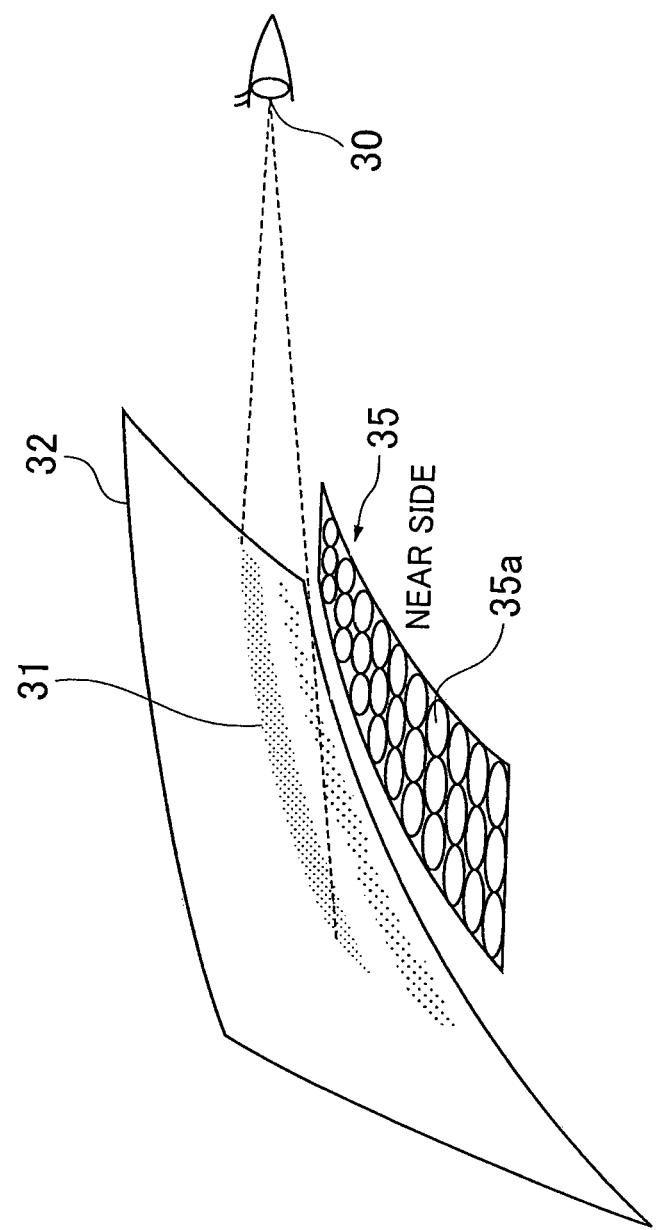
FIG. 10 is a view that shows the configuration of an indicator for prompting for confirming right and left safe conditions.
Figure 11:
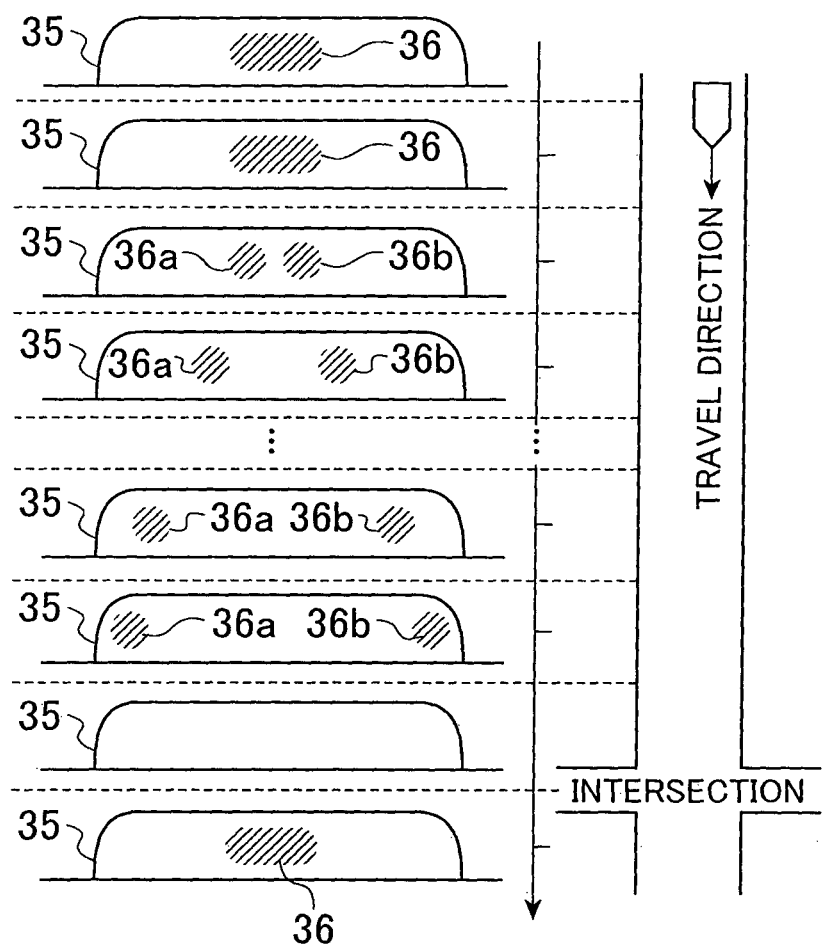
FIG. 11 is a view that shows an example of operation of the indicator shown in FIG. 10.

Alternatively, when the number of times for confirming right and left safe conditions is smaller than the threshold, confirming right and left safe conditions may be prompted with the use of an indicator shown in FIG. 10. As shown in FIG. 10, a light emitting device 35 projects a virtual image 31 onto a windshield 32 with the use of light sources 35a. Thus, it is possible to prompt the driver to confirm right and left safe conditions. Specifically, as shown in FIG. 11, the light emitting device 35 provides a single light-emitting FIG. 36 at a position remote from an intersection, splits the figure into two light-emitting FIGS. 36a, 36b as the host vehicle approaches the intersection, and provides the light-emitting FIGS. 36a, 36b spaced at a wider distance laterally as the host vehicle approaches the intersection. Thus, driver's attention is guided to right and left, and the driver confirms right and left safe conditions.

The target speed profile shown in FIG. 2, or the like, is just one example, and may have any shape. It is only necessary to calculate at least the safe-condition confirmation end point CP, and calculation of the safe-condition confirmation start point SP or the deceleration start point DP may be omitted.

The invention claimed is:

1. A driving support system comprising a control unit, which further includes:
    an electronic control unit (ECU) including a CPU, a ROM, a RAM, and circuitry, the ECU configured to:
    recognize a blind area for a driver in a travel direction of a host vehicle;
    determine a target speed of the host vehicle on the basis of the blind area recognized by the ECU; and
    control driving of the host vehicle on the basis of the target speed determined by the ECU, wherein
        the ECU is configured to determine the target speed on the basis of a safe-condition confirmation end point that is set to a first predetermined position in the travel direction of the host vehicle and that is outside of a possible collision zone,
        the safe-condition confirmation end point is a point subsequent to which the host vehicle passes through the possible collision zone, wherein in the possible collision zone the vehicle avoids collision by advancing past a moving object that appears from the blind area,
        the ECU is configured to determine the target speed further on the basis of a safe-condition confirmation start point that is set to a second predetermined position before the safe-condition confirmation end point in the travel direction of the host vehicle, and
        a line-of-sight angle is preset between the host vehicle and the blind area and the safe-condition confirmation start point is a point at which the host vehicle achieves the preset line-of-sight angle with respect to the blind area.

2. The driving support system according to claim 1, wherein
    the ECU is further configured to compute the safe-condition confirmation end point on the basis of a relative position between the blind area and the host vehicle, a speed of the host vehicle and a preset constant speed of the moving object that appears from the blind area.

3. The driving support system according to claim 1, wherein
    the ECU is further configured to control driving on the basis of the safe-condition confirmation end point and an actual safe-condition confirmation end point, which is a point at which the driver of the host vehicle has started an accelerating operation.

4. The driving support system according to claim 1, the ECU further configured to acquire information about the driver of the host vehicle, wherein the ECU is configured to control driving on the basis of the acquired information about the driver.

5. A driving support system comprising a control unit, which further includes:
    an electronic control unit (ECU) including a CPU, a ROM, a RAM, and circuitry, the ECU configured to:
    recognize a blind area for a driver in a travel direction of a host vehicle;
    determine a target speed of the host vehicle on the basis of the blind area recognized by the ECU; and
    control driving of the host vehicle on the basis of the target speed determined by the ECU, wherein
        the ECU is configured to determine the target speed on the basis of a safe-condition confirmation end point that is set to a first predetermined position in the travel direction of the host vehicle and that is outside of a possible collision zone,
        the safe-condition confirmation end point is a point subsequent to which the host vehicle passes through the possible collision zone, wherein in the possible collision zone the vehicle avoids collision by advancing past a moving object that appears from the blind area,
        the ECU is configured to determine the target speed further on the basis of a safe-condition confirmation start point that is set to a second predetermined position before the safe-condition confirmation end point in the travel direction of the host vehicle, and
        a line-of-sight angle is preset between the host vehicle and the blind area and the safe-condition confirmation start point is a point at which the host vehicle achieves the preset line-of-sight angle with respect to the blind area,
    wherein the ECU is configured to determine the target speed further on the basis of a deceleration start point that is set to a third predetermined position before the safe-condition confirmation start point in the travel direction of the host vehicle, and the deceleration start point is a point at which, by starting deceleration from the deceleration start point, the host vehicle is able to decelerate to a preset reference speed by the time when the host vehicle reaches the safe-condition confirmation start point.

* * * * *